United States Patent [19]

Selman

[11] 4,246,384

[45] Jan. 20, 1981

[54] MAGNESIUM REDUCING AGENT FOR PRODUCING TITANIUM TRIHALIDE CATALYST COMPONENT

[75] Inventor: Charles M. Selman, Bartlesville, Okla.

[73] Assignee: Phillips Petroleum Company, Bartlesville, Okla.

[21] Appl. No.: 958,870

[22] Filed: Nov. 8, 1978

Related U.S. Application Data

[63] Continuation-in-part of Ser. No. 686,608, May 14, 1976, abandoned.

[51] Int. Cl.$^3$ .......................... C08F 4/02; C08F 10/00
[52] U.S. Cl. .................. 526/142; 252/429 B; 252/429 C; 526/125; 526/139; 526/140; 526/141; 526/144; 526/351; 526/352; 526/906
[58] Field of Search ...................... 252/429 B, 429 C; 526/125, 144, 139, 140, 141, 142, 151, 906

[56] References Cited

U.S. PATENT DOCUMENTS

| | | | |
|---|---|---|---|
| 3,293,232 | 12/1966 | Ingberman | 526/906 |
| 3,451,768 | 6/1969 | Luciani et al. | 526/158 |
| 3,801,558 | 4/1974 | Fletcher et al. | 526/151 |
| 3,821,186 | 6/1974 | Grant | 526/151 |

FOREIGN PATENT DOCUMENTS

2230672 12/1972 Fed. Rep. of Germany .
1017977 1/1966 United Kingdom .
1299862 12/1972 United Kingdom .
1359547 7/1974 United Kingdom .
1391322 4/1975 United Kingdom .

OTHER PUBLICATIONS

Raff et al., Crystalline Olefin Polymers, PA, I, Interscience Publ., N.Y., (1965), pp. 366–368.

Primary Examiner—Edward J. Smith

[57] ABSTRACT

Magnesium metal is contacted with an organic halide in the absence of an ether or other complexing diluent to produce a magnesium reducing agent for converting titanium tetrahalide to titanium trihalide. In a first embodiment, the magnesium metal, organic halide, and titanium tetrahalide are introduced into a mill and milled. In a second embodiment, the organic halide is metered dropwise onto the magnesium metal in the absence of any extraneous diluent, and the resulting magnesium reducing agent is thereafter added to a titanium tetrahalide and milled. In a third embodiment, an organic halide containing the titanium tetrahalide is metered dropwise onto magnesium metal in the absence of any extraneous diluent. In each instance the resulting titanium trihalide catalyst component is contacted with an organoaluminum compound activator and used for the polymerization of olefins, preferably the polymerization of propylene.

13 Claims, No Drawings

MAGNESIUM REDUCING AGENT FOR PRODUCING TITANIUM TRIHALIDE CATALYST COMPONENT

CROSS-REFERENCE TO RELATED APPLICATION

This is a continuation-in-part of copending application Ser. No. 686,608, filed May 14, 1976, now abandoned.

BACKGROUND OF THE INVENTION

This invention relates to titanium trihalide catalyst systems produced by reduction of a titanium tetrahalide with a magnesium reducing agent.

It is known to reduce titanium tetrahalide with a true Grignard reagent, that is, a compound or mixture of compounds produced by reacting magnesium and an organic halide in the presence of an ether. Such a compound is conventionally expressed as RMgX. It is also known to produce what is termed in the art as "solventless" Grignard, which is produced by reacting magnesium metal with an organic halide in the presence of a solvent which is designated as a non-solvating solvent (i.e., an inert or non-complexing diluent) such as a hydrocarbon as distinguished from an ether.

True Grignard reagents as a practical matter present serious problems as reducing agents in the production of high activity catalysts in view of the difficulty in removing the large amounts of remaining ether which can reduce the effectiveness of such Grignard reagents used in preparing olefin polymerization catalyst systems.

In certain olefin polymerizations, it is necessary to tailor the catalyst to give the type of polymer desired. Particularly in the polymerization of propylene, it is desirable to cause the polymerization to take place in such a manner as to give a stereospecific polymer.

SUMMARY OF THE INVENTION

It is an object of this invention to provide for the in situ reduction of titanium tetrahalide with the reaction product of an organic halide and magnesium metal without the use of a complexing diluent;

It is a further object of this invention in other aspects thereof to provide a magnesium reducing agent for the reduction of titanium tetrahalide without the use of any extraneous diluent;

It is a further object of this invention to avoid the necessity for removing large amounts of ether from catalyst components;

It is yet a further object of this invention to provide a stereospecific catalyst system;

It is still yet a further object of this invention to provide simplified methods of producing active titanium trihalide catalyst components for olefin polymerization; and It is still yet another object of this invention to provide for the stereospecific polymerization of propylene.

In accordance with one aspect of this invention a titanium catalyst component is prepared by the in situ reduction of titanium tetrahalide with magnesium metal and an organic halide in the absence of a complexing diluent; and in accordance with other aspects of this invention, a magnesium reducing agent for converting titanium tetrahalide to titanium trihalide is produced by the dropwise addition of an organic halide onto magnesium metal in the absence of any extraneous diluent. In other aspects, a magnesium reducing agent for titanium tetrahalide is produced by either slowly metering an organic halide onto magnesium metal or else slowly metering magnesium metal onto an alkyl halide.

DESCRIPTION OF THE PREFERRED EMBODIMENTS

The catalyst system of this invention comprises a titanium catalyst component which is produced by reducing a titanium tetrahalide with a magnesium reducing agent prepared by reacting magnesium metal and an organic halide in the absence of ether in one embodiment or in the absence of any extraneous diluent in other embodiments; and an organoaluminum compound activator. Preferably, there is present also a polar organic compound which acts as an adjuvant.

The organic halide can be a saturated or unsaturated hydrocarbyl halide having the formula RX in which X represents a halogen, preferably chlorine or bromine, and R is selected from an alkynyl, alkenyl, alkyl, aryl, cycloalkenyl or cycloalkyl radical and combinations thereof such as arylalkyl, and the like containing from 1 to about 12 carbon atoms per molecule. The organic halide can also be a polyhalogenated hydrocarbyl halide of the formula $R'X_2$ where X is a halogen atom as before and $R'$ is a saturated divalent aliphatic hydrocarbyl radical, containing from 2 to about 10 carbon atoms per molecule. Exemplary compounds include 1,2-dibromoethane, 1,4-dichlorobutane, cyclohexyl chloride, bromobenzene, 1,10-dibromodecane and the like. An alkyl halide is presently preferred, however, containing from 1 to about 12 carbon atoms. Representative alkyl halides include methyl chloride, n-butyl bromide, n-pentyl chloride, n-dodecyl chloride and the like. A primary alkyl halide such as n-pentyl chloride is most preferred.

The magnesium is in the form of the free metal, preferably in the form of a powder.

The magnesium metal and organic halide are preferably reacted in stoichiometric amounts, although this can vary from 0.25:1 to 1:0.25 preferably from 0.75:1 to 1:1 gram atoms Mg:moles of organic halide.

A typical analysis of the magnesium reducing agent of this invention using n-pentyl chloride added dropwise to magnesium in the absence of any diluent is:

| Compound | Weight Percent |
| --- | --- |
| Hydrocarbon soluble components | |
| Di-n-pentylmagnesium | 25.0 |
| Decane | 8.2 |
| Di-n-decylmagnesium | 1.1 |
| Magnesium n-pentoxide | 0.6 |
| Hydrocarbon Insoluble Components | |
| Magnesium chloride | 55.2 |
| Magnesium | 4.9 |
| Chloromagnesium hydride | 2.3 |
| n-Pentylmagnesium chloride | 2.0 |
| Magnesium n-pentoxide | 0.7 |

This is shown for illustrative purposes and is not intended to limit the scope of the invention. Substantial variation in the exact analysis from that shown is obtained if a different halogen is used or if a different organo radical is substituted for the n-pentyl. However, in all cases there is present a substantial amount (at least 10 weight percent) each of the diorganomagnesium and the magnesium halide. It is the reaction mixture that is the magnesium reducing agent as defined herein.

The titanium tetrahalide is titanium tetrachloride, titanium tetrabromide, or titanium tetraiodide, preferably titanium tetrachloride.

The organoaluminum compound activator component of this invention consists of trialkylaluminum compounds of formula $AlR''_3$, dialkylaluminum compounds of formula $R''_2AlZ$, alkyl aluminum compounds of the formula $R''AlZ_2$ and dialkyl aluminum alkoxides of formula $R''_2AlOR''$ wherein each $R''$ may be the same or different and represents an alkyl group containing from 1 to about 12 carbon atoms per molecule. However, a trialkylaluminum compound is preferred, which can be admixed with one or more of the other activator compounds listed. Z represents either a hydrogen atom or a halogen atom, preferably chlorine or bromine. Preferably the $R''AlZ_2$ compounds are dichlorides or dibromides. Examples of suitable compounds include trimethylaluminum, triethylaluminum, tri-n-dodecylaluminum, dimethylethylaluminum, dimethylaluminum bromide, diethylaluminum chloride, ethylaluminum dichloride, ethylaluminum dihydride, diisobutylaluminum bromide, di-n-dodecylaluminum chloride, ethyl-t-butylaluminum chloride, diisobutylaluminum hydride, dimethylaluminum butoxide, diethylaluminum ethoxide, di-n-dodecylaluminum n-propoxide, and ethylmethylaluminum ethoxide and mixtures thereof. Triethylaluminum is preferred. It is also within the scope of this invention to use an organoaluminum monohalide (previously described) in combination with additional magnesium reducing agent (previously described) as the activator component of the polymerization catalyst system. For ethylene polymerization, the organoaluminum activator preferably consists essentially of triethylaluminum.

It is preferred to use one or more adjuvants which are polar organic compounds, i.e., electron donor compounds (Lewis bases) in addition to the magnesium reduced titanum catalyst component and activator.

These may be precontacted with the activator or titanium tetrahalide or introduced at the same time the titanium tetrahalide is introduced into contact with the magnesium reducing agent or both. Preferably the activator is precontacted with an aromatic ester adjuvant as described in detail hereinbelow.

Suitable compounds for this purpose are described in U.S. Pat. No. 3,642,746 the disclosure of which is hereby incorporated by reference. They include amides, amines, aldehydes, arsines, alcoholates, esters, ethers, ketones, nitriles, phosphines, phosphites, phosphoramides, stibines, sulfones and sulfoxides. Exemplary compounds include triethylamine, acetamide, benzaldehyde, sodium ethoxide, ethyl acetate, diethyl ether, acetone, benzonitrile, triphenyl phosphine, triphenyl phosphite, hexamethyl phosphoric triamide, triethyl stibine, trioctyl arsine, dimethyl sulfone and dibutyl sulfoxide.

Presently preferred adjuvants, when premixed with the organoaluminum compounds, are the lower alkyl esters (i.e., 1 to 4 carbon atoms per molecule) of benzoic acid which may be additionally substituted in the para position to the carboxyl group with a monovalent radical selected from the group consisting of —F, —Cl, Br, —I, —OH, —OR''', —COCR''', —SH, —NH, —NR'''$_2$, —NHCOR''', —NO$_2$, —CN, —CHO, —COOR''', —CONH$_2$, —CONR$_2$''', —SO$_2$R''', and —CF$_3$. The R''' group is a 1-4 carbon atom alkyl radical. Examples of suitable compounds include ethyl anisate (p-methoxybenzoate), ethyl benzoate, methyl benzoate, ethyl p-dimethylaminobenzoate, ethyl p-fluorobenzoate, isopropyl p-diethylaminobenzoate, butyl p-fluorobenzoate, n-propyl p-cyanobenzoate, ethyl p-trifluoromethylbenzoate, methyl p-hydroxybenzoate, methyl p-acetylbenzoate, methyl p-nitrobenzoate, ethyl p-mercaptobenzoate and mixtures thereof. Particularly preferred esters are ethyl anisate and ethyl benzoate. Triphenyl phosphite, triethylamine and dimethylaniline are preferred for mixing with the other components as they are contacted. As noted hereinabove another adjuvant such as ethyl anisate or ethyl benzoate may already be mixed with the organoaluminum compound.

If one or more adjuvants are used with the titanium tetrahlide component, the molar ratio of triatnium tetrahalide compound to adjuvant (or adjuvants) is generally in the range of about 1:1 to about 200:1.

If one or more adjuvants are used with the organoaluminum compound or compounds in the activator component, the molar ratio of organoaluminum compound(s) component to adjuvant (or adjuvants) is generally in the range of about 1:1 to about 350:1. However, in no instance should the total adjuvant from all sources exceed a 1:1 mole ratio of adjuvant to aluminum.

The atom ratio of aluminum to titanium in the catalyst systems of the invention ranges from about 20:1 to about 450:1, more preferably from about 40:1 to about 150:1.

There are three separate embodiments to this invention as follows:

EMBODIMENT 1

In this embodiment, which is the preferred embodiment of the invention, the magnesium metal, organic halide, titanium tetrahalide and adjuvant if used are introduced essentially simultaneously into a means capable of intensive mixing. By essentially simultaneously introduced, is meant that there is no contact between the titanium tetrahalide and an already reacted magnesium metal-organic halide mixture and that the ingredients are added essentially in a single increment each as opposed to being added dropwise. This is not to preclude the possibility of having the magnesium metal and organic halide already mixed together (but not reacted) prior to introduction into the mill. The milling is carried out in the absence of any ether or other complexing diluent and preferably in the absence of any extraneous diluent, i.e., even without an inert hydrocarbon diluent. The term "in the absence of any extraneous diluent" (i.e., added diluent) as used throughout this specification and claims is meant to exclude the introduction of any complexing solvent or any noncomplexing or inert solvent such as a hydrocarbon. Of course, the organic halide itself is a liquid. Also after the reaction is essentially complete an inert diluent or solvent may be used to facilitate subsequent handling. An inert non-complexing hydrocarbon diluent can be present, however, if desired. Suitable hydrocarbon diluents include pentane, hexane, cyclohexane, heptane, and other inert hydrocarbons diluents normally used as diluents in olefin polymerization. The ingredients are then milled under intensive conditions for a time within the range of 0.1 to 200, preferably 1 to 50, more preferably 3 to 16 hours. Milling times of 5 to 100 and 15 to 75 hours are also suitable. The milling can be carried out in any conventional mill utilized for preparing catalysts such as a ball mill, a rod mill, a pebble mill, or a vibratory ball mill. In the case of a vibratory ball mill, the milling times can be about one-tenth of those set out hereinabove.

The term "means capable of intensive mixing" as used herein is also intended to encompass high speed shearing means, colloid mills and means to pass the components through an orifice of a homogenizing valve at high pressure, for instance 1,000 psig or greater. All of these produce intensive mixing conditions where heat is generated and agglomerates are broken up.

The milling temperature is generally whatever is produced by the intensive milling which is generally above 40° C., preferably 40° C. to 110° C., more preferably 50° to 60° C. With a vibratory ball mill some cooling may be necessary and it is possible to cool enough to maintain the temperature at about room temperature.

After the milling is complete, the product is recovered and used with the activator compound to form the complete polymerization catalyst system. As noted hereinabove, the activator compound too is preferably contacted with an adjuvant such as ethyl anisate prior to contact with the product of the milling and as set out hereinabove, a particular subgroup of the adjuvants is particularly desirable for use with the activator compound.

Since in the preferred embodiment, no liquid diluent of any kind is utilized, that is, neither an ether or an inert non-solvating hydrocarbon, it is frequently desirable simply to utilize the monomer to be polymerized as the vehicle to transfer the catalyst to the reactor. This is particularly desirable when using an easily liquefied monomer such as propylene.

Preferably the milled product is washed with an inert liquid such as a nonreactive hydrocarbon to remove any unreacted TiCl$_4$. Suitable wash liquids include, pentane, hexane, cyclohexane, heptane and the like.

EMBODIMENT 2a

The magnesium reducing agent is formed by the dropwise addition of the organic halide onto magnesium metal. The temperature is generally the reflux temperature for the organic halide, although higher or lower temperatures can be used by using pressure or cooling. The reaction product can be subsequently suspended in an inert non-solvating hydrocarbon which is described hereinabove for storage and the hydrocarbon subsequently removed by vacuum to obtain the reagent. In any event, the thus-formed magnesium reducing agent and the titanium tetrahalide are then milled as described hereinabove to produce the titanium catalyst component. As with Embodiment 1, this intensive milling can be carried out either in the presence of an inert hydrocarbon as described previously or in the absence of a hydrocarbon, but in any event in all aspects of this embodiment and embodiment 2b hereinbelow, the magnesium reducing agent itself is formed in the absence of any extraneous diluent, i.e., in the absence of both ether or other complexing diluents and inert non-complexing hydrocarbons. The activator compound is then contacted with the resulting titanium catalyst component as in the Embodiment 1, generally by simply introducing the product of the ball milling and the activator compound as separate streams into the reactor.

EMBODIMENT 2b

In this embodiment, an organic halide mixed with the titanium tetrahalide is added dropwise onto the magnesium metal. The resulting reaction is carried out in the absence of any extraneous diluent, i.e., in the absence of both ether or other complexing diluents and inert non-complexing hydrocarbon diluents. The temperature is generally the reflux temperature of the organic halide although higher or lower temperatures can be used. The resulting product is recovered and used with the activator as in Embodiment 1. This embodiment preferably involves no milling at all, although the product of the dropwise addition of the organic halide mixed with the titanium tetrahalide onto the magnesium metal could be milled if desired.

Further with respect to embodiments 2a and 2b, the reason for the dropwise addition of the halide to the magnesium metal is that simple contact of all of the halide and all of the metal causes the surface of the metal to become less reactive, i.e., the presence of all of the halide acts as a diluent which prevents the magnesium particles from rubbing each other to give a fresh surface. Other slow methods of combining the halide and the magnesium can also be utilized in embodiments 2a and 2b. For instance, a fine stream or spray of the halide onto the magnesium can be used. Also, a similar result can be achieved by slowly shaving the magnesium metal into the halide, thus giving a continuous fresh surface of magnesium. Thus, in embodiments 2a and 2b where there is an absence of milling to give shear of the magnesium, it is essential that either the halide is metered slowly onto the magnesium or else that the magnesium is metered slowly into the halide.

The catalysts of this invention are suitable for the polymerization of at least one aliphatic mono-1-olefin containing 2 to 8 carbon atoms per molecule. The catalyst are particularly suitable for the stereospecific polymerization of propylene.

The conditions suitable for carrying out the polymerization reaction are similar to other related processes in which a catalyst system comprising reduced titanium is employed. The process is conveniently carried out in liquid phase in the presence or absence of an inert hydrocarbon diluent, e.g., n-heptane, n-pentane, isobutane, cyclohexane, etc., but it is not limited to liquid phase conditions. If no added diluent is used, the process can be carried out in liquid monomer which is preferred.

The polymerization temperature employed depends on the monomer employed and the mode of reaction selected but generally falls within the range of 60°–212° F. (15.5°–100° C.). In the liquid phase of propylene, for example, a temperature in the range of about 75° to about 200° F. (24°–93° C.) can be employed. Any convenient pressure is used. However, in liquid phase operation, sufficient pressure is employed to maintain the reactants in liquid phase within the reaction zone.

Gram atom ratios of Ti/Mg used in the catalyst preparation are preferably from 0.5:1 to 5:1, more preferably 0.75:1 to 1.25:1. Ratios below 0.5:1 are operable but give lower productivities. The actual ratio in the catalyst itself will be slightly lower than that used in its preparation.

As is known in the art, control of the molecular weight of the polymer is readily achieved by the presence of small amounts of hydrogen during the polymerization.

The polymers prepared with the catalysts of this invention are normally solid resinous materials which can be extruded, molded, etc., into useful articles including film, fibers, containers and the like.

EXAMPLE I

A Norton grinding jar, size 000, located in a dry box was charged in the order named with 6.1 g (0.247 gram atoms) magnesium powder (50 mesh), 30.4 ml (0.25 moles) n-pentyl chloride (or molar equivalent of another alkyl halide, when another halide was used), electron donor compound, if used, 27.4 ml (0.25 moles) titanium tetrachloride, and 50 ml dry n-heptane, if used. The closed jar was removed from the dry box and rotated at 150 rpm for 65 hours. The operation was conducted in a room maintained at about 25° C. The jar was then returned to the dry box and the contents processed. If n-heptane was not used during milling, the pasty contents of the jar were washed onto a filter with dry n-heptane and filtered. The purple solid was washed again with dry n-heptane and dried under vacuum. If n-heptane was present during milling, the contents of the jar was filtered, the solid washed with dry n-heptane and dried under vacuum.

The activator compound used was triethylaluminum (TEA) premixed with ethyl anisate (EA) adjuvant with a variable molar ratio as shown in the Table. As noted in the Table, another electron donor compound was used on occasion.

A 1 liter, stirred reactor purged with dry nitrogen was charged under a propylene flush, in the order named, with activator compound, titanium catalyst component, adjuvant (if any in addition to that in the activator, if any), 0.5 liter hydrogen (STP) and about 200 g liquid propylene. Sufficient liquid propylene was added as required during the reaction to maintain the vessel in the liquid full state. The vessel and its contents were heated to the specified temperature. After one hour, the contents were removed, the polymer washed with methanol and dried under vacuum.

The reaction temperature used, or adjuvants employed, and the results obtained are given in Table I. Productively is given in terms of grams polymer per gram component per hour, where the component is shown as Ti. Xylene solubles are determined according to established practice known in the art by separating xylene-soluble material from the total polymer or aliquot thereof and calculating the weight percent thus separated. In each run 9.8 mmoles triethyl aluminum was used.

TABLE I

| | | | Polymerization of Propylene | | | | | | | |
|---|---|---|---|---|---|---|---|---|---|---|
| | Ti | | Activator | | | | Re- | Productivity | | |
| Run No. | Catalyst Component Mmoles | Molar Ratio TEA/EA | Adjuvant or Coactivator Type | Mmoles | Molar Ratios Al/Ti | Al/Adjuvant | ac- tor °F. | Temp. °C. | g/g Component/hr. Component Ti | Xylene Solubles, Wt. % | Notes |
| 1 | 0.108 | 3.5 | none | | 90 | — | 170 | 77 | 18240 | 9.1 | |
| 2 | .108 | 3.5 | none | | 90 | — | 170 | 77 | 9630 | 15.8 | 1 |
| 3 | .146 | 3.0 | none | | 67 | — | 170 | 77 | 11550 | 10.7 | 2 |
| 4 | .111 | 3.0 | none | | 88 | — | 170 | 77 | 12240 | 9.8 | 3 |
| 5 | .146 | 3.5 | ⁹DEAC | 0.5 | 67 | 19.6 | 170 | 77 | 19980 | 13.9 | 4 |
| 6 | .129 | 3.0 | none | | 76 | — | 170 | 77 | 10160 | 10.8 | 5 |
| 7 | .136 | 2.7 | none | | 72 | — | 180 | 82 | 7970 | 8.1 | 5 |
| 8 | .159 | 2.5 | none | | 62 | — | 175 | 79 | 6320 | 7.7 | 5 |
| 9 | .112 | 3.0 | none | | 87 | — | 170 | 77 | 12190 | 8.2 | 6 |
| 10 | .152 | 2.7 | none | | 64 | — | 180 | 82 | 7260 | 7.2 | 6 |
| 11 | .171 | 3.0 | TPP | 0.03 | 57 | 327 | 170 | 77 | 13290 | 10.3 | 7 |
| 12 | .105 | 3.5 | none | | 93 | — | 175 | 79 | 14900 | 10.0 | |
| 13 | .125 | 3.0 | none | | 78 | — | 175 | 79 | 14550 | 10.0 | |
| 14 | .125 | 3.0 | none | | 78 | — | 175 | 79 | 16230 | 12.5 | |
| 15 | .125 | 2.7 | none | | 78 | — | 175 | 79 | 9420 | 7.6 | |
| 16 | .120 | 2.5 | none | | 82 | — | 175 | 79 | 6420 | 8.4 | |
| 17 | .113 | 2.7 | ⁹DEAC | 0.75 | 87 | 13 | 175 | 79 | 10000 | 8.0 | 4 |
| 18 | .130 | 2.7 | ⁹DEAC | 1.25 | 75 | 7.8 | 175 | 79 | 13530 | 6.8 | 4 |
| 19 | .116 | 3.5 | none | | 84 | — | 175 | 79 | 18600 | 13.1 | 8 |
| 20 | .146 | 3.0 | none | | 67 | — | 175 | 79 | 10940 | 8.5 | 8 |
| 21 | .126 | 2.7 | none | | 78 | — | 175 | 79 | 9080 | 8.6 | 8 |
| 22 | .103 | 2.5 | none | | 95 | — | 175 | 79 | 8740 | 8.8 | 8 |
| 23 | .126 | 2.7 | ⁹DEAC | 0.75 | 78 | 13 | 175 | 79 | 9050 | 8.7 | 8 |
| 24 | .067 | 2.7 | ⁹DEAC | 1.00 | 145 | 9.8 | 175 | 79 | 11080 | 12.4 | 8 |
| 25 | .101 | 2.7 | ⁹DEAC | 1.25 | 97 | 7.8 | 175 | 79 | 12050 | 11.5 | 8 |

Notes:
1 Mixture of n-C$_5$H$_{11}$Cl/n-C$_5$H$_{11}$I = 4 used in magnesium reducing agent preparation.
2 Used n-C$_5$H$_{11}$Br as the alkyl halide in magnesium reducing agent preparation.
3 Used C$_8$H$_7$Cl as the alkyl halide in magnesium reducing agent preparation.
4 DEAC is diethylaluminum chloride.
5 prepared titanium catalyst component in presence of 1 weight percent triethylamine based on TiCl$_4$.
6 Like note 5 except titanium catalyst component milled in the presence of n-heptane diluent.
7 TPP is triphenyl phosphite.
8 Titanium catalyst component milled in the absence of a diluent for 65 hours. 50 ml dry n-hexane added and mixture milled an additional 24 hours. The titanium catalyst component was recovered by filtration and dried under a vacuum.
⁹Coactivator.

Inspection of the data presented in Table I reveals that active catalyst systems are prepared in the practice of this invention. Runs 1 and 12 are representative of the results obtained by preparing a catalyst system according to the preferred embodiment 1, with no diluent even during milling. Runs 2 and 3 illustrate that alkyl halides other than n-pentyl chloride can be used in preparing the magnesium reducing agent. The effect of DEAC as a coactivator for improving productivity of the total catalyst system is shown in run 5. Runs 6, 7 and 8 suggest that the xylene-soluble content of the polymer can be reduced by the presence of 1 weight percent triethylamine adjuvant with the magnesium reducing agent-titanium tetrachloride mixture as is being milled. Run 11 shows an active catalyst system with TPP as an adjuvant. The effect on productivity of the ratio of TEA-/EA in the activator compound is shown in runs 12-16. The results suggest that a ratio below about 2.7 adversely affects productivity although, perhaps, less xylene soluble polymer is produced. Runs 17 and 18 compared to run 15 again show that DEAC included as part of the activator compound system improves productivity compared to a run made in the absence of DEAC. This is illustrated in runs 23–25 compared to run 21 in which the titanium catalyst component was prepared by additionally milling a previously prepared titanium catalyst component with n-hexane. Runs 19–22 (hexane milling) compared to runs 12–16 (no hexane) at similar TEA/EA activtor compound ratios show some data scattering with a suggestion that hexane washing may be desirable in some instances, i.e., at an activator compound ratio (TEA/EA) of about 3.5, to improve catalyst productivity.

EXAMPLE II

The effect of aging on catalyst productivity and xylene solubles was determined by preparing a titanium catalyst component sample according to the procedure and component amounts of Example I by milling together for 65 hours, in the absence of diluent, n-pentyl chloride, magnesium powder and titanium tetrachloride. The procedure of the first Example was also followed in recovering and drying the milled product.

The product was used with an activator compound consisting of premixed triethylaluminum activator compound and ethyl anisate adjuvant to polymerize propolyene in the manner described in the first Example. In each instance, a reactor temperature of 170° F. (77° C.) was used. Also in each instance 9.8 mmoles of triethylaluminum was used and the TEA/EA ratio was 3.5. The results are presented in Table II.

TABLE II

| | Polymerization of Propylene | | | |
|---|---|---|---|---|
| Run No. | Ti Catalyst Component (mmoles) | Productivity g/g Component/Hr. Component Ti | Xylene Solubles, Weight Percent | Aging Time, Days |
| 1 | 0.143 | 15100 | 11.4 | <1 |
| 2 | .122 | 16650 | 14.2 | 7 |
| 3 | .124 | 13520 | 12.2 | 14 |
| 4 | .079 | 13220 | 12.1 | 21 |
| 5 | .092 | 14160 | 11.3 | 28 |
| 6 | .123 | 15730 | 12.7 | 35 |

Inspection of the results of Table II shows that a titanium catalyst component prepared according to this invention can be stored over a period of weeks and utilized with an activator compound to prepare polypropylene at high rates.

EXAMPLE III

A titanium catalyst component was formed in accordance with embodiment (2a) wherein a stoichiometric amount of n-pentyl chloride was added dropwise to magnesium metal and the resulting magnesium reducing agent contacted with titanium tetrachloride and ball milled for 17 hours. N,N-dimethylaniline added at the beginning of the milling was used as an adjuvant in an amount of 3.1 millimoles. The titanium was present in an amount of 0.4 millimoles. The resulting milled product was introduced into a reactor along with an activator compound comprising 1.25 millimoles of triethylaluminum and 1.25 millimoles of diethylaluminum chloride. Polymerization temperature was 170° F. A productivity of 3640 grams polypropylene per gram of titanium per hour was obtained with a xylene solubles content of 43 percent. Other runs using catalyst systems of embodiment (2a) gave productivities within the range of 65 to 23,075 grams polypropylene per gram titanium per hour and xylene solubles contents within the range of 14 to 68 weight percent. The run giving 23,075 g/g used DEAC plus TEA activator as in the run giving 3640 and had a solubles content of 32 percent.

EXAMPLE IV

A titanium catalyst component was prepared in accordance with embodiment (2b) of this invention by blending titanium tetrachloride and n-pentyl chloride. This blend was placed in a dropping funnel under a nitrogen atmosphere and fitted onto a three-necked flask containing powdered magnesium. The blend was added dropwise onto the metal powder over a 4.75 hour period at such a rate that the inside of the flask remained moist. Following this, 100 ml of heptane was added and the mixture stirred for another 4 hours. The flask was taken to a dry box and the contents filtered. The solid material was washed with heptane and then dried by vacuum. The titanium content of the solid was determined by a colorimetric test. Into a nitrogen-purged 1 liter stirred autoclave was charged activator compound comprising 2.0 millimoles of triethylaluminum and 1.0 millimoles diethylaluminum chloride, the product (0.033 millimole of titanium) obtained by the dropwise addition of the halide-TiCl$_4$ mixture onto the magnesium, and 2.4 millimoles of dimethyl aniline adjuvant, 0.5 liter hydrogen, and propylene in that order. The contents were then heated to a polymerization temperature of 170° F. and the vessel run liquid full of propylene one hour. The productivity in grams of polypropylene per gram titanium trichloride per hour was 11,200 with a xylene solubles content of 28.3 percent. Productivities of 110 to 1270 were obtained in similar runs where the triethylaluminum was omitted.

EXAMPLE V

Into a 1-liter Vibratom vessel containing 1700 grams ½" steel balls were charged in order 12 grams (0.5 mole) powdered (50 mesh) Mg, 61 mls (53.6 gms=0.5 mole) n-pentyl chloride, and 55 mls (94.9 gms=0.5 mole) titanium tetrachloride. This was done in a dry box. Upon completion, the vessel was removed from the box and clamped onto the vibratory mill where it was shaken for 5.7 hours. No external cooling of the vessel was done and afterwards it was returned into the dry box. The contents of the vessel were flushed with dry hexane into a quart pop bottle and then allowed to sit overnight. Washing the solid precipitated macroon catalyst with dry hexane was done using first a decanting technique. After the washing operation was completed, the sample was filtered and dried by vacuum for 4 hours. Recovery through a 50 mesh sieve yielded 73 grams of a purple or maroon solid with no evidence of magnesium specks.

This catalyst A was used for ethylene polymerization with the following results. (Charge order TEA, catalyst, isobutane diluent).

| | Time | Temp. °C. | Pressure, Psig |
|---|---|---|---|
| TEA, 1 ml. 15 wt. % in n-heptane | 7:41 | | |
| Catalyst A - 0.0090 grams | | | |
| Charge Order TEA, Invention Catalyst A, | | | |

-continued

| | Time | Temp. °C. | Pressure, Psig |
|---|---|---|---|
| isobutane | | | |
| Ethylene up to pressure | 7:50 | | |
| | 8:05 | 79.8 | 280 |
| | 8:20 | 80.3 | 280 |
| | 8:35 | 80.0 | 280 |
| Ethylene off and vented | 8:50 | 80:1 | 280 |
| Yield 367 g polymer, | | | |
| Productivity 40,778 grams of polymer/g cat/hr. | | | |

While this invention has been described in detail for the purpose of illustration, it is not to be construed as limited thereby, but is intended to cover all changes and modifications within the spirit and scope thereof.

I claim:

1. A process comprising contacting magnesium metal, a primary alkyl halide or alkyl dihalide, said halide or dihalide being selected from chloride and bromide, said alkyl radical containing from 1 to 12 carbon atoms in the case of the halide and 2 to 12 in the case of the dihalide, and titanium tetrachloride essentially simultaneously and subjecting same to intensive milling by means of ball milling, rod milling, pebble milling, or vibratory ball milling in the absence of any extraneous diluent; thereafter activating the thus produced titanium catalyst component by contacting same with an activator comprising a trialkylaluminum compound, a dialkylaluminum chloride, and a polar organic adjuvant which is an electron donor, said adjuvant further being characterized as a 1 to 4 carbon atom alkyl ester of a substituted or unsubstituted benzoic acid, a mole ratio of said aluminum compound to said adjuvant being within the range 1:1 to 350:1; an atom ratio of aluminum to titanium being within the range of 40:1 to 150:1, said magnesium metal and organic halide being introduced in a ratio within the range of 0.75:1 to 1:1 gram atoms of Mg:moles of organic halide, and wherein an atom ratio of the titanium to magnesium used is within the range of 0.75:1 to 1.25:1.

2. A method according to claim 1 wherein said intensive milling is done by ball milling.

3. A method according to claim 1 wherein said alkyl halide is a primary alkyl halide, said alkyl radical containing from 1 to 12 carbon atoms.

4. A method according to claim 1 wherein said trialkylaluminum compound is triethylaluminum.

5. A method according to claim 1 wherein said adjuvant is ethyl anisate.

6. A method according to claim 1 wherein said dialkylaluminum chloride is diethylaluminum chloride.

7. A method according to claim 6 wherein said trialkylaluminum compound is triethylaluminum and said adjuvant is ethyl anisate.

8. A method according to claim 1 wherein said magnesium metal and said organic halide are introduced in about stoichiometric amounts.

9. A method according to claim 1 wherein said milling is done by ball milling, said activator is triethylaluminum plus ethyl anisate and diethylaluminum chloride, and said magnesium metal and organic halide are introduced in about stoichiometric amounts.

10. A catalyst according to claim 9.

11. A catalyst according to claim 1.

12. A process comprising contacting at least one mono-1-olefin having 2 to 8 carbon atoms per molecule under polymerization conditions with the catalyst of claim 11.

13. A process comprising contacting propylene under polymerization conditions with the catalyst of claim 10.

* * * * *